US007056980B2

(12) United States Patent
Adedeji et al.

(10) Patent No.: US 7,056,980 B2
(45) Date of Patent: *Jun. 6, 2006

(54) POLY(ARYLENE ETHER) COMPOSITIONS, ARTICLES THEREOF AND METHODS OF MAKING THEM

(75) Inventors: Adeyinka Adedeji, Albany, NY (US); Thomas J. Hartle, Delmar, NY (US); John C. Haylock, Reston, VA (US); Vijay Mhetar, Slingerlands, NY (US); Ganesh Kannan, Bangalore (IN)

(73) Assignee: General Electric, Pittsfield, MA (US)

( * ) Notice: Subject to any disclaimer, the term of this patent is extended or adjusted under 35 U.S.C. 154(b) by 172 days.

This patent is subject to a terminal disclaimer.

(21) Appl. No.: 10/604,098

(22) Filed: Jun. 26, 2003

(65) Prior Publication Data
US 2004/0068053 A1    Apr. 8, 2004

Related U.S. Application Data

(63) Continuation-in-part of application No. 10/063,336, filed on Apr. 12, 2002, now Pat. No. 6,872,777.

(60) Provisional application No. 60/300,794, filed on Jun. 25, 2001.

(51) Int. Cl.
C08L 53/00    (2006.01)
(52) U.S. Cl. .............. 525/88; 525/71; 525/70; 525/63
(58) Field of Classification Search .......... 525/88, 525/71, 70, 63
See application file for complete search history.

(56) References Cited

U.S. PATENT DOCUMENTS

| 4,239,673 A | 12/1980 | Lee, Jr. |
| 4,242,263 A | 12/1980 | Lee, Jr. |
| 4,299,757 A | 11/1981 | Kuribayashi et al. |
| 4,383,082 A | 5/1983 | Lee, Jr. |
| 4,460,743 A | 7/1984 | Abe et al. |
| 4,480,057 A | 10/1984 | Sano |
| 4,565,684 A | 1/1986 | Tibbetts et al. |
| 4,572,813 A | 2/1986 | Arakawa |
| 4,628,072 A | 12/1986 | Shiraki et al. |
| 4,663,230 A | 5/1987 | Tennent |
| 4,713,416 A | 12/1987 | Del Giudice et al. |
| 4,764,559 A | 8/1988 | Yamauchi et al. |
| 4,772,657 A | 9/1988 | Akiyama et al. |
| 4,816,289 A | 3/1989 | Komatsu et al. |
| 4,863,997 A | 9/1989 | Shibuya et al. |
| 4,876,078 A | 10/1989 | Arakawa et al. |
| 4,892,904 A | 1/1990 | Ting |
| 4,962,148 A | 10/1990 | Orikasa et al. |
| 4,985,495 A | 1/1991 | Nishio et al. |
| 4,990,558 A | 2/1991 | DeNicola, Jr. et al. |
| 4,994,508 A | 2/1991 | Shiraki et al. |
| 5,024,818 A | 6/1991 | Tibbetts et al. |
| 5,061,753 A | 10/1991 | Maruyama et al. |
| 5,071,911 A | 12/1991 | Furuta et al. |
| 5,071,912 A | 12/1991 | Furuta et al. |
| 5,075,376 A | 12/1991 | Furuta et al. |
| 5,079,295 A | 1/1992 | Furuta et al. |
| 5,081,187 A | 1/1992 | Maruyama et al. |
| 5,086,112 A | 2/1992 | Togo et al. |
| 5,106,696 A | 4/1992 | Chundury et al. |
| 5,124,410 A | 6/1992 | Campbell |
| 5,132,363 A | 7/1992 | Furuta et al. |
| 5,149,740 A | 9/1992 | Maruyama et al. |
| 5,159,004 A | 10/1992 | Furuta et al. |
| 5,162,433 A | 11/1992 | Nishio et al. |
| 5,162,435 A | 11/1992 | Shibuya et al. |
| 5,162,440 A | 11/1992 | Akkapeddi et al. |
| 5,165,909 A | 11/1992 | Tennent et al. |
| 5,166,264 A | 11/1992 | Lee, Jr. et al. |
| 5,182,151 A | 1/1993 | Furuta et al. |
| 5,191,024 A | 3/1993 | Shibata et al. |
| 5,206,281 A | 4/1993 | Furuta |
| 5,262,477 A | 11/1993 | Kasai et al. |
| 5,268,425 A | 12/1993 | Furuta et al. |
| 5,272,208 A | 12/1993 | Shiraki et al. |
| 5,272,209 A | 12/1993 | Shiraki et al. |
| 5,278,220 A | 1/1994 | Vermeire et al. |
| 5,286,791 A | 2/1994 | DeNicola, Jr. et al. |
| 5,290,856 A | 3/1994 | Okamoto et al. |
| 5,296,540 A | 3/1994 | Akiyama et al. |
| 5,304,593 A | 4/1994 | Nishio et al. |
| 5,321,081 A | 6/1994 | Chundury et al. |
| 5,369,173 A | 11/1994 | Furuta |
| 5,370,813 A | 12/1994 | Denicola, Jr. et al. |
| 5,397,822 A | 3/1995 | Lee, Jr. et al. |
| 5,405,902 A | 4/1995 | Nishio et al. |
| 5,418,287 A | 5/1995 | Tanaka et al. |
| 5,424,360 A | 6/1995 | Nagaoka et al. |
| 5,428,091 A | 6/1995 | Abe et al. |

(Continued)

FOREIGN PATENT DOCUMENTS

EP    0 326 895 A2    1/1989

(Continued)

OTHER PUBLICATIONS

Claims 1-42, 44, and 47-51 of copending U.S. Appl. No. 10/063,336.*

(Continued)

Primary Examiner—Duc Truong

(57) ABSTRACT

A composition comprising poly(arylene ether) resin and a hydrogenated block copolymer of an alkenyl aromatic compound and a conjugated diene, wherein the hydrogenated block copolymer has up to about 20 percent residual pendant aliphatic unsaturation and at least about 30 percent residual in-chain aliphatic unsaturation.

34 Claims, No Drawings

U.S. PATENT DOCUMENTS

| | | | |
|---|---|---|---|
| 5,461,111 | A | 10/1995 | Modic et al. |
| 5,473,015 | A | 12/1995 | DeNicola, Jr. et al. |
| 5,494,962 | A | 2/1996 | Gauthy et al. |
| 5,589,152 | A | 12/1996 | Tennent et al. |
| 5,591,382 | A | 1/1997 | Nahass et al. |
| 5,648,424 | A | 7/1997 | Miwa et al. |
| 5,705,556 | A | 1/1998 | Djiauw et al. |
| 5,777,028 | A | 7/1998 | Okada et al. |
| 5,902,850 | A | 5/1999 | Chino et al. |
| 5,998,029 | A | 12/1999 | Adzima et al. |
| 6,005,050 | A | 12/1999 | Okada et al. |
| 6,013,726 | A | 1/2000 | Nakano et al. |
| 6,031,049 | A | 2/2000 | Chino et al. |
| 6,045,883 | A | 4/2000 | Akiyama et al. |
| 6,057,401 | A | 5/2000 | Modic |
| 6,258,881 | B1 | 7/2001 | Moritomi |
| 6,300,417 | B1 | 10/2001 | Sue et al. |
| 6,495,630 | B1 | 12/2002 | Adedeji et al. |
| 6,509,412 | B1 | 1/2003 | Hall |
| 6,545,080 | B1 | 4/2003 | Adedeji et al. |
| 6,627,701 | B1 | 9/2003 | Adedeji et al. |
| 2002/0023845 | A1 | 2/2002 | Ding et al. |

FOREIGN PATENT DOCUMENTS

| | | |
|---|---|---|
| EP | 0 412 787 A2 | 8/1990 |
| EP | 0765914 | 5/1995 |
| EP | 1029876 | 9/1999 |
| GB | 1559262 | 12/1977 |
| WO | WO 90/05759 | 5/1990 |
| WO | WO 91/05016 | 4/1991 |

OTHER PUBLICATIONS

Derwent Abstract Record for JP 04-028740.
Derwent Abstract Record for JP 04-279697.
Derwent Abstract Record for JP 63-113050.
Derwent Abstract Record for JP 2000-143891.
Chemical Abstracts Record for JP 07166026.
Chemical Abstracts Record for JP 04183748.
U.S. Appl. No. 09/682,921, filed Nov. 1, 2001, Adedeji, et al.
U.S. Appl. No. 09/682,923, filed Nov. 1, 2001, Adedeji, et al.
U.S. Appl. No. 09/682,926, filed Nov. 1, 2001, Adedeji, et al.
Derwent Abstract for JP 58-93730.
Chemical Abstracts Record for JP07165998.
U.S. Appl. No. 09/683,766, filed Feb. 12, 2002, Adedeji, et al.
JP 06057008. Publication Date of Jan. 3, 1994, Abstract Only. 1 pg.
G.-X. Wei, H.-J. Sue, J. Chu, C. Huang, K. Gong, "Morphology and Mechanical Property of Poly(phenylene oxide) Modified Polypropylene Blends", ANTEC '99, vol. III, New York City, May 2-6, 1999, pp. 3443-3447.
M. K. Akkapeddl and B. VanBuskirk, Adv. Polym. Technol. (1992), vol. 11, No. 4, pp. 263-275.
TUFTEC® H1043 Technical Bulletin, Dec. 16, 1999, Asahi Chemical Industry Co., Ltd., pp. 1-5.
TUFTEC® P-Series High Performance Thermoplastic Elastomer, pp. 1-2, <http: www.asahi-kasei.co.jp/plastic/e/technical/br/p-series.htm>.
Derwent Abstract Record for JP 01-098647.
Derwent Abstract Record for JP 03-259941.
Derwent Abstract for JP 63-113049.
Chemical Abstracts Record for JP 03181555.
Derwent Abstract Record for JP 04-007357.
Derwent Abstract Record for JP 04-028739.
Chemical Abstracts Record for JP 03185058.
Chemical Abstracts Record for JP 03231962.
Derwent Abstract Record for JP 04-293942.
Derwent Abstract Record for JP 05-070679.
Derwent Abstract Record for JP 05-295184.
Derwent Abstract Record for JP 06-009828.
Derwent Abstract Record for JP 06-016924.
Derwent Abstract Record for JP 06-057130.
Derwent Abstract Record for JP 06-136202.
Derwent Abstract Record for JP 07-003083.
Derwent Abstract Record for JP 07-304908.
Derwent Abstract Record for JP 09-316322.
Derwent Abstract Record for JP 11-060836.
Derwent Abstract Record for JP 63-113047.

* cited by examiner

POLY(ARYLENE ETHER) COMPOSITIONS, ARTICLES THEREOF AND METHODS OF MAKING THEM

CROSS REFERENCE TO RELATED APPLICATIONS

This application is a continuation-in-part of U.S. patent application Ser. No. 10/063,336 filed on Apr. 12, 2002, now U.S. Pat. No. 6,872,777, which claims the benefit of U.S. Provisional Application No. 60/300,794, filed Jun. 25, 2001, both of which are incorporated by reference herein.

BACKGROUND OF INVENTION

This disclosure relates to a novel composition comprising poly(arylene ether).

Poly(arylene ether)s are commercially attractive materials because of their unique combination of physical, chemical, and electrical properties. Furthermore, the combination of poly(arylene ether)s with other resins provides compositions which result in additional overall properties such as chemical resistance, high strength, and high flow.

Poly(arylene ether) compositions are widely used in injection molding and can be successfully employed in the injection molding of large parts (weighing greater than 11 kilograms). Injection molding of large parts typically requires the use of high speed injection that generates a large amount of shear at the gate. Some poly(arylene ether) blends may demonstrate delamination when injection molded at high speeds. Delamination is evidenced by bubbling or peeling at the surface of the molded part.

It is therefore apparent that there is a need for poly(arylene ether) compositions with improved delamination resistance properties.

SUMMARY OF INVENTION

Disclosed herein is a composition comprising poly(arylene ether) resin and a hydrogenated block copolymer of an alkenyl aromatic compound and a conjugated diene, wherein the hydrogenated block copolymer has up to about 20 percent residual pendant aliphatic unsaturation and at least about 30 percent residual in-chain aliphatic unsaturation.

In another embodiment, a method of making an article comprises molding a composition comprising poly(arylene ether) resin and a hydrogenated block copolymer of an alkenyl aromatic compound and a conjugated diene, wherein the hydrogenated block copolymer has up to about 20 percent residual pendant aliphatic unsaturation and at least about 30 percent residual in-chain aliphatic unsaturation, wherein the article has little or no delamination.

DETAILED DESCRIPTION OF INVENTION

It is believed that poly(arylene ether) compositions and poly(arylene ether)/poly(alkenyl aromatic) compositions containing an impact modifier comprise at least two phases, a poly(arylene ether) or poly (arylene ether)/poly(alkenyl aromatic) phase and an impact modifier phase and the impact modifier phase is distributed throughout the poly(arylene ether) or poly(arylene ether)/poly(alkenyl aromatic) phase.

During injection molding the point of highest stress or shear occurs at or near the gate. Without being bound by theory, it is believed that delamination occurs in blends containing saturated impact modifiers because the impact modifier regions in the composition elongate and align, locally decreasing the quantity of the poly(arylene ether) or poly (arylene ether)/poly(alkenyl aromatic) phase. It is believed that this phenomenon does not occur with unsaturated impact modifiers due to crosslinking of the impact modifier during molding or earlier processing steps. Crosslinking between polymer chains is thought to prevent extensive elongation and alignment of the impact modifier regions. However, poly(arylene ether) or poly(arylene ether)/poly(alkenyl aromatic) compositions containing unsaturated impact modifiers typically exhibit a significantly greater loss of properties after heat aging compared to poly(arylene ether)/poly(alkenyl aromatic) compositions containing a saturated impact modifier.

Disclosed herein is a composition comprising poly(arylene ether), an optional poly(alkenyl aromatic) resin and a hydrogenated block copolymer of an alkenyl aromatic compound and a conjugated diene, wherein the hydrogenated block copolymer has up to about 20 percent residual pendant aliphatic unsaturation and at least about 30 percent residual in-chain aliphatic unsaturation. Surprisingly it was found that use of the hydrogenated block copolymer with up to about 20 percent residual pendant aliphatic unsaturation resulted in a composition that showed little or no delamination after injection molding and excellent retention of properties after heat aging.

The term poly(arylene ether) includes polyphenylene ether (PPE) and poly(arylene ether) copolymers; graft copolymers; poly(arylene ether) ionomers; and block copolymers of alkenyl aromatic compounds, vinyl aromatic compounds, and poly(arylene ether); and combinations comprising at least one of the foregoing. Poly(arylene ether)s per se, are known polymers comprising a plurality of structural units of the formula (I):

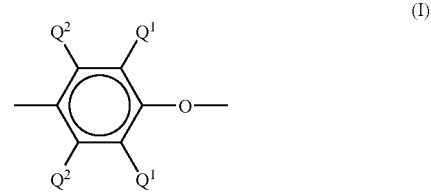

wherein for each structural unit, each $Q^1$ is independently hydrogen, halogen, primary or secondary lower alkyl (e.g., alkyl containing up to 7 carbon atoms), phenyl, haloalkyl, aminoalkyl, hydrocarbonoxy, halohydrocarbonoxy wherein at least two carbon atoms separate the halogen and oxygen atoms, or the like; and each $Q^2$ is independently hydrogen, halogen, primary or secondary lower alkyl, phenyl, haloalkyl, hydrocarbonoxy, halohydrocarbonoxy wherein at least two carbon atoms separate the halogen and oxygen atoms, or the like. Preferably, each $Q^1$ is alkyl or phenyl, especially $C_{1-4}$ alkyl, and each $Q^2$ is hydrogen.

Both homopolymer and copolymer poly(arylene ether)s are included. The preferred homopolymers are those containing 2,6-dimethylphenylene ether units. Suitable copolymers include random copolymers containing, for example, such units in combination with 2,3,6-trimethyl-1,4-phenylene ether units or copolymers derived from copolymerization of 2,6-dimethylphenol with 2,3,6-trimethylphenol. Also included are poly(arylene ether) containing moieties prepared by grafting vinyl monomers or polymers such as polystyrenes, as well as coupled poly(arylene ether) in which coupling agents such as low molecular weight polycarbonates, quinones, heterocycles and formals undergo reaction with the hydroxy groups of two poly(arylene ether) chains to produce a higher molecular weight polymer. Poly (arylene ether)s of the present disclosure further include combinations and reaction products comprising at least one of the above.

Poly(arylene ether)s generally have a number average molecular weight of about 3,000 to about 40,000 atomic mass units (amu) and a weight average molecular weight of about 20,000 to about 80,000 amu, as determined by gel permeation chromatography. Poly(arylene ether)s may have an intrinsic viscosity of about 0.10 to about 0.60 deciliters per gram (dl/g), preferably about 0.29 to about 0.48 dl/g, as measured in chloroform at 25 degrees Celsius (Â° C.). It may also possible to utilize a high intrinsic viscosity poly (arylene ether) and a low intrinsic viscosity poly(arylene ether) in combination. Determining an exact ratio, when two intrinsic viscosities are used, may depend somewhat on the exact intrinsic viscosities of the poly(arylene ether) used and the ultimate physical properties that are desired.

Poly(arylene ether)s are generally prepared by the oxidative coupling of a monohydroxyaromatic compound such as 2,6-xylenol or 2,3,6-trimethylphenol. Catalyst systems are generally employed for such coupling; they generally contain a heavy metal compound such as a copper, manganese or cobalt compound, usually in combination with various other materials.

Particularly useful poly(arylene ether)s for many purposes are those which comprise molecules having an aminoalkyl-containing end group. The aminoalkyl radical is generally located in an ortho position to the hydroxy group. Products containing such end groups may be obtained by incorporating an appropriate primary or secondary monoamine such as di-n-butylamine or dimethylamine as one of the constituents of the oxidative coupling reaction mixture. Also frequently present are 4-hydroxybiphenyl end groups, generally obtained from reaction mixtures in which a by-product diphenoquinone is present, especially in a copper-halide-secondary or tertiary amine system. A substantial proportion of the polymer molecules, generally constituting as much as about 90% by weight of the polymer, may contain an aminoalkyl-containing and 4-hydroxybiphenyl end groups.

Based upon the foregoing, it will be apparent to those skilled in the art that the contemplated poly(arylene ether) resin may include many of those poly(arylene ether)s presently known, irrespective of variations in structural units or ancillary chemical features.

The composition may comprise poly(arylene ether) in an amount of about 10 to about 98 weight percent, based on the total weight of the composition. Within this range, it may be preferred to use a poly (arylene ether) in an amount greater than or equal to about 20 weight percent, preferably greater than or equal to about 30 weight percent. Also within this range, it may be preferred to use a poly(arylene ether) in an amount less than or equal to about 80 weight percent, preferably less than or equal to about 55 weight percent.

The composition may further comprise a poly(alkenyl aromatic) resin. The term "poly(alkenyl aromatic) resin" as used herein includes polymers prepared by methods known in the art including bulk, suspension, and emulsion polymerization, which contain at least 25% by weight of structural units derived from an alkenyl aromatic monomer of the formula

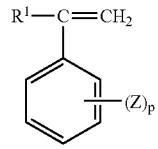

wherein $R^1$ is hydrogen, $C_1$–$C_8$ alkyl, halogen, or the like; Z is vinyl, halogen, $C_1$–$C_8$ alkyl, or the like; and p is 0 to 5. Preferred alkenyl aromatic monomers include styrene, chlorostyrenes such as p-chlorostyrene, and methylstyrenes such as p-methylstyrene. The poly (alkenyl aromatic) resins include homopolymers of an alkenyl aromatic monomer; random copolymers of an alkenyl aromatic monomer, such as styrene, with one or more different monomers such as acrylonitrile, butadiene, alpha-methylstyrene, ethylvinylbenzene, divinylbenzene and maleic anhydride; and rubber-modified poly(alkenyl aromatic) resins comprising blends and/or grafts of a rubber modifier and a homopolymer of an alkenyl aromatic monomer (as described above), wherein the rubber modifier may be a polymerization product of at least one $C_4$–$C_{10}$ nonaromatic diene monomer, such as butadiene or isoprene, and wherein the rubber-modified poly(alkenyl aromatic) resin comprises about 98 to about 70 weight percent of the homopolymer of an alkenyl aromatic monomer and about 2 to about 30 weight percent of the rubber modifier, preferably about 88 to about 94 weight percent of the homopolymer of an alkenyl aromatic monomer and about 6 to about 12 weight percent of the rubber modifier.

The stereoregularity of the poly(alkenyl aromatic) resin may be atactic or syndiotactic. Highly preferred poly(alkenyl aromatic) resins include atactic and syndiotactic homopolystyrenes. Suitable atactic homopolystyrenes are commercially available as, for example, EB3300 from Chevron, and P1800 from BASF. Suitable syndiotactic homopolystyrenes are commercially available, for example, under the tradename QUESTRAÂ®(e.g., QUESTRAÂ® WA550) from Dow Chemical Company. Highly preferred poly(alkenyl aromatic) resins further include the rubber-modified polystyrenes, also known as high-impact polystyrenes or HIPS, comprising about 88 to about 94 weight percent polystyrene and about 6 to about 12 weight percent polybutadiene, with an effective gel content of about 10% to about 35%. These rubber-modified polystyrenes are commercially available as, for example, GEH 1897 from General Electric Plastics, and BA 5350 from Chevron.

The composition optionally comprises the poly(alkenyl aromatic) resin in an amount up to about 90 weight percent, based on the total weight of the composition. Within this range, it may be preferable to use the poly(alkenyl aromatic) resin in an amount greater than or equal to about 20 weight percent, preferably greater than or equal to about 35 weight percent. Also within this range, it may be preferable to use the poly (alkenyl aromatic) resin in an amount less than or equal to about 80 weight percent, preferably less than or equal to about 65 weight percent.

The composition comprises a selectively hydrogenated block copolymer of an alkenyl aromatic compound and a conjugated diene, wherein the selectively hydrogenated block copolymer has up to about 20 percent residual pendant aliphatic unsaturation and at least about 30 percent residual in-chain aliphatic unsaturation. For brevity, this component is hereinafter referred to as the "selectively hydrogenated block copolymer". The selectively hydrogenated block copolymer is a copolymer comprising (A) at least one block derived from an alkenyl aromatic compound and (B) at least one block derived from a conjugated diene, in which the aliphatic unsaturated group content in the block (B) has been selectively reduced by hydrogenation. In particular, in-chain aliphatic unsaturation (i.e., aliphatic unsaturation resulting from 1,4-incorporation of the conjugated diene to the copolymer) remains at least about 30 percent unhydrogenated, preferably at least about 40 percent unhydrogenated, more preferably at least about 50 percent unhydrogenated; and pendant aliphatic unsaturation (i.e., aliphatic unsaturation resulting from 1,2-incorporation of the conjugated diene to the copolymer) remains up to about 20 percent unhydrogenated, preferably up about 10 percent unhydrogenated, more preferably up to about 5 percent unhydrogenated. In one embodiment, the ratio of the percentage of unhydrogenated in-chain aliphatic unsaturation to the percentage of unhydrogenated pendant aliphatic unsaturation is at least about 2, preferably at least about 5, more preferably at least about 10. The selective hydrogenation is illustrated in the Scheme below for the example of selective hydrogenation of a styrene-butadiene-styrene block copolymer.

preferred are diblock, triblock, and tetrablock structures, with the A-B-A triblock structure being particularly preferred.

The alkenyl aromatic compound providing the block (A) is represented by formula

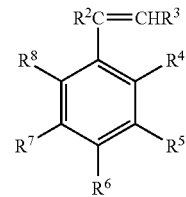

wherein $R^2$ and $R^3$ each independently represent a hydrogen atom, a $C_1$–$C_8$ alkyl group, a $C_2$–$C_8$ alkenyl group, or the like; $R^4$ and $R^8$ each independently represent a hydrogen atom, a $C_1$–$C_8$ alkyl group, a chlorine atom, a bromine atom, or the like; and $R^5$–$R^7$ each independently represent a hydrogen atom, a $C_1$–$C_8$ alkyl group, a $C_2$–$C_8$ alkenyl group,

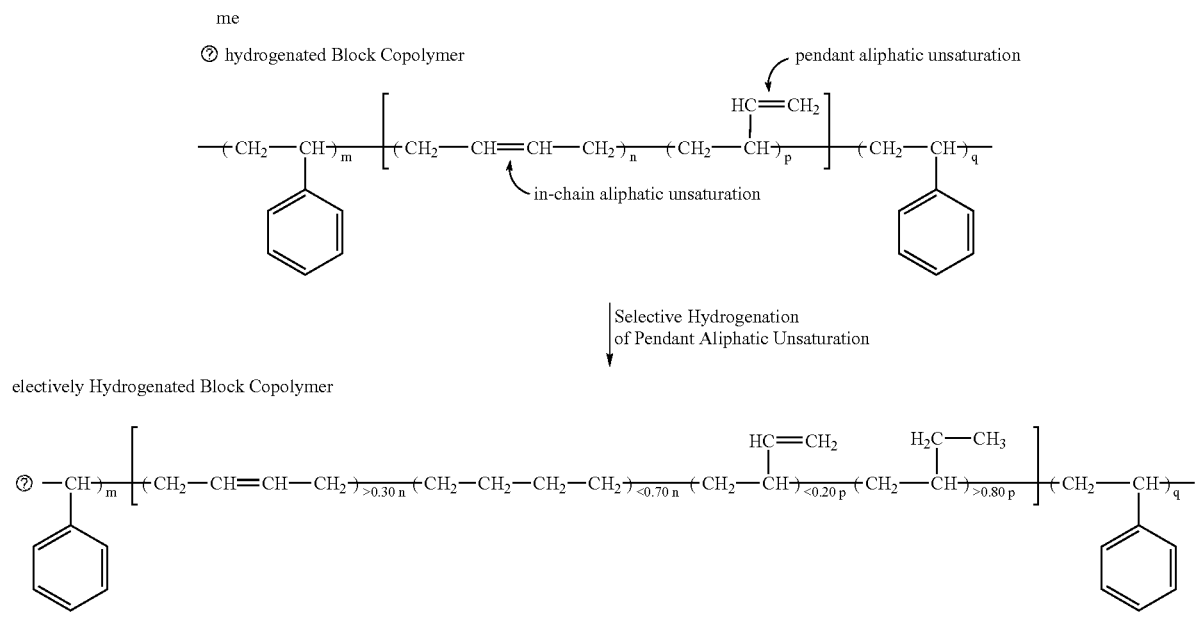

⟨?⟩ indicates text missing or illegible when filed

The degree of hydrogenation of in-chain and pendant aliphatic unsaturation may be evaluated by a variety of methods, including infrared spectroscopy, and $^1$H and $^{13}$C nuclear magnetic resonance (NMR) spectroscopies.

The arrangement of blocks (A) and (B) includes a linear structure, a grafted structure, and a radial teleblock structure with or without a branched chain. Preferred among these structures are linear structures embracing diblock (A-B block), triblock (A-B-A block or B-A-B block), tetrablock (A-B-A-B block), and pentablock (A-B-A-B-A block or B-A-B-A-B block) structures as well as linear structures containing 6 or more blocks in total of A and B. More or the like, or $R^4$ and $R^5$ are taken together with the central aromatic ring to form a naphthyl group, or $R^5$ and $R^6$ are taken together with the central aromatic ring to form a naphthyl group.

Specific examples, of the alkenyl aromatic compounds include styrene, p-methylstyrene, alpha-methylstyrene, vinylxylenes, vinyltoluenes, vinyinaphthalenes, divinylbenzenes, bromostyrenes, chlorostyrenes, and the like, and combinations comprising at least one of the foregoing alkenyl aromatic compounds. Of these, styrene, alpha-methylstyrene, p-methylstyrene, vinyltoluenes, and vinylxylenes are preferred, with styrene being more preferred.

Specific examples of the conjugated diene include 1,3-butadiene, 2-methyl-1,3-butadiene, 2,3-dimethyl-1,3-butadiene, 1,3-pentadiene, and the like. Preferred among them are 1,3-butadiene and 2-methyl-1,3-butadiene, with 1,3-butadiene being more preferred.

In addition to the conjugated diene, the selectively hydrogenated block copolymer may contain a small proportion of a lower olefinic hydrocarbon such as, for example, ethylene, propylene, 1-butene, dicyclopentadiene, a non-conjugated diene, or the like.

The content of the repeating unit derived from the alkenyl aromatic compound in the selectively hydrogenated block copolymer may be about 20 to about 90 weight percent, based on the total weight of the selectively hydrogenated block copolymer. Within this range, the alkenyl aromatic content may preferably be at least about 30 weight percent, more preferably at least about 55 weight percent. Also within this range, the alkenyl aromatic content may preferably be up to about 80 weight percent, more preferably up to about 75 weight percent.

There is no particular limitation on the mode of incorporation of the conjugated diene in the selectively hydrogenated block copolymer backbone. For example, when the conjugated diene is 1,3-butadiene, it may be incorporated with about 1% to about 99% 1,2-incorporation, with the remainder being 1,4-incorporation.

The hydrogenated block copolymer preferably may have a number average molecular weight of about 5,000 to about 500,000 g/mol, as determined by gel permeation chromatography (GPC) using polystyrene standards. The molecular weight distribution of the selectively hydrogenated block copolymer as measured by GPC is not particularly limited. The copolymer may have any ratio of weight average molecular weight to number average molecular weight.

Particularly preferred selectively hydrogenated block copolymers are the styrene-(butadiene-butylene) diblock and styrene-(butadiene-butylene)-styrene triblock copolymers obtained by highly selective hydrogenation of styrene-butadiene and styrene-butadiene-styrene triblock copolymers, respectively. For example, styrene-(butadiene-butylene)-styrene triblock copolymers result when the pendant unsaturation in the styrene-butadiene-styrene triblock copolymer precursor is essentially completely hydrogenated (i.e., at least about 95% hydrogenated; preferably at least about 98% hydrogenated), whereas the in-chain unsaturation remains at least about 30% unhydrogenated.

The selectively hydrogenated block copolymer may be synthesized by block polymerization followed by hydrogenation as described, for example, in U.S. Pat. No. 4,994,508 to Shiraki et al. Suitable selectively hydrogenated block copolymers include the styrene-(butadiene-butylene)-styrene triblock copolymers (SBBS) commercially available from Asahi Chemical as, for example, TUFTEC®P-series copolymers.

The composition may comprise the selectively hydrogenated block copolymer in an amount of about 2 to about 40 weight percent. Within this range, the amount of selectively hydrogenated block copolymer used may be greater than or equal to about 3, preferably greater than or equal to about 4 weight percent. Also within this range, the amount of selectively hydrogenated block copolymer used may be less than or equal to about 20, preferably less than or equal to about 10 weight percent.

In addition to the components described above, the composition may comprise one or more additives known in the art. Such additives may include, for example, stabilizers, mold release agents, processing aids, flame retardants, drip retardants, nucleating agents, UV blockers, dyes, pigments, fillers, conductive fillers (e.g., conductive carbon black, and vapor grown carbon fibers having an average diameter of about 3 to about 500 nanometers), antioxidants, anti-static agents, blowing agents, and the like. Such additives are well known in the art and appropriate amounts may be readily determined.

The preparation of the compositions is normally achieved by blending the ingredients under conditions for the formation of an intimate blend. Such conditions often include mixing in single or twin screw type extruders or similar mixing devices that can apply a shear to the components.

The composition may be shaped into articles having excellent retention of physical properties using a variety of methods. For example, the composition may be shaped into various articles through injection molding, into sheets or films through extrusion molding, or into containers or trays through extrusion molding combined with thermal molding. In an exemplary embodiment, the composition is injection molded.

All patents cited by reference are incorporated herein by reference.

Having described the invention in detail, the following examples are provided. The examples should not be considered as limiting the scope of the invention, but merely as illustrative and representative thereof.

EXAMPLES

The following examples were made using the materials listed in Table 2 according to the formulations shown in Table 3. The amounts of the components are in weight percent, based on the total weight of the composition. All examples contained Irganox 1010, ZnS and ZnO in amounts less than or equal to about 0.03 weight percent. The components were intimately blended in melt and injection molded into the appropriate specimen for testing. Notched Izod testing was performed at 23° C. and −30° C. according to ASTM D 256. Notched Izod values are expressed in Joules per meter (J/m). Flexural modulus and multiaxial impact at 23° C. and −30° C. was performed according to ASTM D 790. Flexural modulus results are expressed in MegaPascals (MPa) and multiaxial impact results are expressed in Joules (J). Tensile elongation was tested according to ASTM D 638. Samples were tested before and after heat aging. Beneath each physical property, the percentage of retention after heat aging is shown. Heat aging was performed in air-circulated ovens at 110° C. for 1000 hours.

Delamination was evaluated by injection molding a 0.5 kilogram part havin a thickness of about 3 millimeters at varying injection speeds (10–95%). T molded parts were allowed to equilibrate at 23° C. for 24 hours. Parts wer observed for a visible bubble near the gate (within about 100 millimeters). The size of the bubble was measured. A cross-cut was made at the gate and the skin was pulled in the direction of flow until it tore. The length of th peeled skin was measured. The rating system is shown in Table 1.

TABLE 1

| Delamination rating | Description |
|---|---|
| 1 | No visible bubble, skin cannot be peeled |
| 2 | No visible bubble, skin peeled <15.2 centimeters (cm) |

TABLE 1-continued

| Delamination rating | Description |
|---|---|
| 3 | Visible bubble (<1 inch diameter); skin peeled <15.2 cm |
| 4 | Visible bubble (>1 inch diameter), skin peeled <15.2 cm |
| 5 | Visible bubble (>1 inch diameter), skin peeled >15.2 cm |

TABLE 2

| Component | Tradename/Supplier |
|---|---|
| Polyphenylene ether (PPE) with an intrinsic viscosity of 0.46 dl/g at 25° C. in chloroform | Noryl/GE Plastics |
| Unsaturated impact modifier (SBS) | Kraton D1101/Shell |
| Low molecular weight saturated impact modifier (SEBS 1650) | Kraton G1650/Shell |
| High molecular weight saturated impact modifier (SEBS 1651) | Kraton G1651/Shell |
| Selectively hydrogenated block copolymer (SBBS) | Tuftec JT82P/Asahi |
| Antioxidant | Irganox |
| ZnS | — |
| ZnO | — |
| High impact polystyrene (HIPS) | GEH 1890/GE Plastics |

TABLE 3

|  | 1* | 2* | 3* | 4* | 5* | 6 | 7* | 8 | 9 |
|---|---|---|---|---|---|---|---|---|---|
| PPE | 40 | 38 | 36 | 38 | 36 | 38 | 36 | 38 | 36 |
| SBS | — | 3.8 | 7.3 | — | — | — | — | — | — |
| SEBS 1650 | — | — | — | 3.8 | 7.3 | — | — | — | — |
| SEBS 1651 | — | — | — | — | — | 3.8 | 7.3 | — | — |
| SBBS | — | — | — | — | — | — | — | 3.8 | 7.3 |
| HIPS | 60 | 57 | 55 | 57 | 55 | 57 | 55 | 57 | 55 |
| Flexural Modulus in MPa | 2351 | 2234 | 1972 | 2206 | 2075 | 2220 | 2096 | 2193 | 2075 |
| % retention | 104 | 104 | 106 | 106 | 105 | 106 | 105 | 104 | 104 |
| Notched Izod at 23° C. in J/m | 235 | 336 | 417 | 331 | 449 | 342 | 486 | 352 | 465 |
| % retention | 71.4 | 65.4 | 55.9 | 75.1 | 64.9 | 76.7 | 65.9 | 69.7 | 62.1 |
| Notched Izod at −30° C. in J/m | 128 | 224 | 240 | 235 | 288 | 224 | 326 | 235 | 294 |
| % retention | 69.6 | 54.2 | 46.5 | 70.8 | 57.2 | 70.8 | 61.6 | 70.3 | 64.4 |
| Multiaxial impact at 23° C. in J | 28.5 | 41.4 | 42.6 | 41.1 | 46.1 | 44.3 | 51.0 | 42.3 | 49.5 |
| % retention | 79.6 | 72.9 | 66.3 | 84 | 75.8 | 89.4 | 80.5 | 85 | 75.9 |
| Multiaxial impact at −30° C. in J | 19.0 | 26.0 | 37.8 | 20.9 | 40.7 | 25.4 | 44.9 | 29.1 | 43.3 |
| % retention | 61.2 | 60.1 | 42 | 70.6 | 64.2 | 71.1 | 59.1 | 67.9 | 56.6 |
| Tensile elongation in percent | 42 | 37 | 43.4 | 31.9 | 53.5 | 32.1 | 43.5 | 34.4 | 51.6 |
| % retention | 92.4 | 99.6 | 102.5 | 97.6 | 93.7 | 96.5 | 92.7 | 99.8 | 104.1 |
| Delamination at 95% injection speed | 1 | 1 | 2 | 3 | 5 | 2.5 | 4 | 1 | 2 |

*Comparative example

As can be seen by the foregoing examples, compositions comprising a selectively hydrogenated block copolymer have little or no delamination, similar to the comparative examples containing unsaturated block copolymer, and a retention of physical properties after heat aging similar to compositions containing saturated block copolymer. Thus it is clear that compositions described herein comprising selectively hydrogenated block copolymer have a unique combination of little or no delamination and good retention of properties after heat aging.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the invention scope thereof. It is, therefore intended that the invention not be limited to the particular embodiment disclosed as the best mode contemplated for carrying out this invention, but that the invention will include all embodiments falling within the scope of appended claims.

The invention claimed is:

1. A composition comprising poly(arylene ether) resin and a hydrogenated block copolymer of an alkenyl aromatic compound and a conjugated diene, wherein the hydrogenated block copolymer has up to about 20 percent residual pendant aliphatic unsaturation and at least about 30 percent residual in-chain aliphatic unsaturation.

2. The composition of claim 1, wherein the poly(arylene ether) resin is present in an amount of about 10 to about 98 weight percent, based on the total weight of the composition.

3. The composition of claim 1, further comprising a poly(alkenyl aromatic) resin.

4. The composition of claim 3, wherein the poly(alkenyl aromatic) resin is present in an amount up to about 90 weight percent, based on the total weight of the composition.

5. The composition of claim 3, wherein the poly(alkenyl aromatic) resin is a rubber-modified poly(alkenyl aromatic) resin.

6. The composition of claim 1, wherein hydrogenated block copolymer of an alkenyl aromatic compound and a conjugated diene is present in an amount of about 2 to about 40 weight percent, based on the total weight of the composition.

7. The composition of claim 1, wherein the poly(arylene ether) resin has an intrinsic viscosity of about 0.1 to about 0.6 deciliter per gram as measured in chloroform at 25° C.

8. The composition of claim 1, wherein hydrogenated block copolymer of an alkenyl aromatic compound and a conjugated diene is a butadiene-butylene)-styrene block copolymer.

9. The composition of claim 1, further comprising one or more additives selected from the group consisting of stabilizers, mold release agents, processing aids, flame retardants, drip retardants, nucleating agents, UV blockers, dyes, pigments, fillers, conductive fillers, anti-oxidants, anti-static agents, and blowing agents.

10. An article comprising the composition of claim 1.

11. A composition comprising poly(arylene ether) resin, a rubber-modified poly(alkenyl aromatic) resin and a styrene-(butadiene-butylene)-styrene block copolymer.

12. A method of making an article comprising molding a composition comprising poly(arylene ether) resin and a hydrogenated block copolymer of an alkenyl aromatic compound and a conjugated diene, wherein the hydrogenated block copolymer has up to about 20 percent residual pendant aliphatic unsaturation and at least about 30 percent residual in-chain aliphatic unsaturation.

13. The method of claim 12, wherein the poly(arylene ether) resin is present in an amount of about 10 to about 98 weight percent, based on the total weight of the composition.

14. The method of claim 12, wherein the composition further comprises a poly(alkenyl aromatic) resin.

15. The method of claim 14, wherein the poly(alkenyl aromatic) resin is present in an mount up to about 90 weight percent, based on the total weight of the composition.

16. The method of claim 14, wherein the poly(alkenyl aromatic) resin is a rubber-modified poly(alkenyl aromatic) resin.

17. The method of claim 12, wherein hydrogenated block copolymer of an alkenyl aromatic compound and a conjugated diene is present in an amount of about 2 to about 44) weight percent, based on the total weight of the composition.

18. The method of claim 12, wherein the poly(arylene ether) resin has an intrinsic viscosity of about 0.1 to about 0.6 deciliter per gram as measured in chloroform at 25° C.

19. The method of claim 12, wherein hydrogenated block copolymer of an alkenyl aromatic compound and a conjugated diene is a styrene-(butadiene-butylene)-styrene block copolymer.

20. The method of claim 12, further comprising one or more additives selected from the group consisting of stabilizers, mold release agents, processing aids, flame retardants, drip retardants, nucleating agents, UV blockers, dyes, pigments, fillers, conductive fillers, antioxidants, anti-static agents, and blowing agents.

21. The method of claim 12, wherein molding comprises injection molding.

22. An article made by the method of claim 12.

23. A composition comprising poly(arylene ether) resin, poly(alkenyl aromatic) resin and a hydrogenated block copolymer of an alkenyl aromatic compound and a conjugated diene, wherein the hydrogenated block copolymer has up to about 20 percent residual pendant aliphatic unsaturation and at least about 30 percent residual in-chain aliphatic unsaturation.

24. The composition of claim 23, wherein the poly (arylene ether) resin is present in an amount of about 10 to about 98 weight percent, based on the total weight of the composition.

25. The composition of claim 23, wherein the poly (alkenyl aromatic) resin is present in an amount up to about 90 weight percent, based on the total weight of the composition.

26. The composition of claim 23, wherein the poly (alkenyl aromatic) resin is a rubber-modified poly(alkenyl aromatic) resin.

27. The composition of claim 23, wherein hydrogenated block copolymer of an alkenyl aromatic compound and a conjugated diene is present in an amount of about 2 to about 40 weight percent, based on the total weight of the composition.

28. The composition of claim 23, wherein the poly (arylene ether) resin has an intrinsic viscosity of about 0.1 to about 0.6 deciliter per gram as measured in chloroform at 25° C.

29. The composition of claim 23, wherein hydrogenated block copolymer of an alkenyl aromatic compound and a conjugated diene is a styrene-(butadiene-butylene)-styrene block copolymer.

30. The composition of claim 23, further comprising one or more additives selected from the group consisting of stabilizers, mold release agents, processing aids, flame retardants, drip retardants, nucleating agents, UV blockers, dyes, pigments, fillers, conductive fillers, antioxidants, anti-static agents, and blowing agents.

31. A method of making an article comprising molding a composition comprising poly(arylene ether) resin, poly(alkenyl aromatic) resin and a hydrogenated block copolymer of an alkenyl aromatic compound and a conjugated diene, wherein the hydrogenated block copolymer has up to about 20 percent residual pendant aliphatic unsaturation and at least about 30 percent residual in-chain aliphatic unsaturation.

32. A composition consisting essentially of a poly(arylene ether) resin, poly(alkenyl aromatic) resin and a hydrogenated block copolymer of an alkenyl aromatic compound and a conjugated diene, wherein the hydrogenated block copolymer has up to about 20 percent residual pendant aliphatic unsaturation and at least about 30 percent residual in-chain aliphatic unsaturation.

33. The reaction product of a composition comprising a poly(arylene ether) resin, poly(alkenyl aromatic) resin and a hydrogenated block copolymer of an alkenyl aromatic compound and a conjugated diene, wherein the hydrogenated block copolymer has up to about 20 percent residual pendant aliphatic unsaturation and at least about 30 percent residual in-chain aliphatic unsaturation.

34. A composition comprising
   about 30 to about 55 weight percent of a poly(arylene other) resin;
   about 35 to about 65 weight percent of a poly(alkenyl aromatic resin); and about 4 to about 20 weight percent of a hydrogenated block copolymer of an alkenyl aromatic compound and a conjugated diene, wherein the hydrogenated block copolymer has up to about 20 percent residual pendant aliphatic unsaturation and at least about 30 percent residual in-chain aliphatic unsaturation, wherein all amounts are based on the total weight of the composition.

* * * * *

UNITED STATES PATENT AND TRADEMARK OFFICE
CERTIFICATE OF CORRECTION

PATENT NO. : 7,056,980 B2  Page 1 of 1
APPLICATION NO. : 10/604098
DATED : June 6, 2006
INVENTOR(S) : Adedeji et al.

It is certified that error appears in the above-identified patent and that said Letters Patent is hereby corrected as shown below:

Column 3:
Line 16, before "C.)" delete -- Â⁰ --

Column 4:
Line 15, after ""The" delete "poly (alkenyl aromatic)" and insert therefor -- poly(alkenyl aromatic) --
Line 43, after "tradename" delete "QUESTRAÂ" and insert therefor -- QUESTRA --
Line 43, after "e.g.," delete "QUESTRAÂ" and insert therefor -- QUESTRA --
Line 70, after "the" delete "poly (alkenyl aromatic)" and insert therefor -- poly(alkenyl aromatic) --

Column 7:
Line 54, after "TUFTEC" delete "Â"

Column 8:
Line 39, after "23" delete "Â⁰"
Line 39, after "30" delete "Â⁰"
Line 42, after "23" delete "Â⁰"
Line 42, after "30" delete "Â⁰"
Line 49, after "110" delete "Â⁰"
Line 53, after "part" delete "havin" and insert therefor -- having --
Line 55, after "23" delete "Â⁰"

Column 11:
Line 14, after "a" insert --styrene--
Line 39, after "an" delete "mount" and insert therefor -- amount --
Line 46, after "about" delete "44" and insert therefor -- 40 --

Signed and Sealed this

Seventeenth Day of July, 2007

JON W. DUDAS
*Director of the United States Patent and Trademark Office*